UNITED STATES PATENT OFFICE.

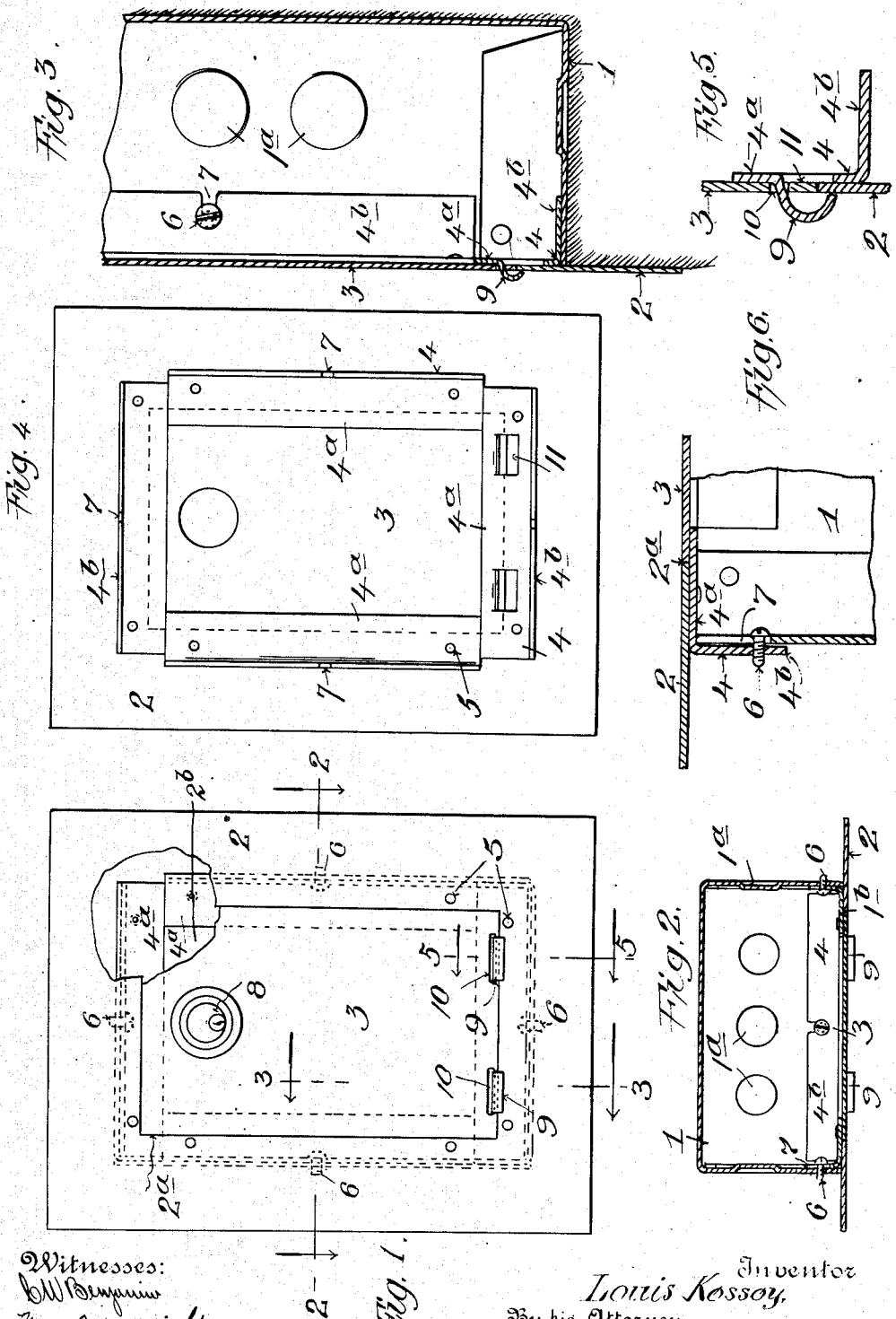

LOUIS KOSSOY, OF NEW YORK, N. Y.

ELECTRIC CUT-OUT BOX.

1,187,534.  Specification of Letters Patent.  Patented June 20, 1916.

Application filed April 1, 1914. Serial No. 828,668.

*To all whom it may concern:*

Be it known that I, LOUIS KOSSOY, a subject of the Czar of Russia, and resident of New York city, borough of the Bronx, in the county of the Bronx and State of New York, have invented certain new and useful Improvements in Electric Cut-Out Boxes, of which the following is a specification.

My invention pertains to improvements in boxes and like structures, particularly adapted to contain electric fittings, and has for its object to provide simple, cheap and efficient means for retaining the cover or lid on the box and to effectively close the box at the edges of the cover or lid and retain the latter in proper position, and a further object of my invention is to provide simple and efficient means for hinging said cover or lid upon the box.

My invention further comprises novel details of improvement and combinations of parts that will be more fully hereinafter set forth and then pointed out in the claims.

Reference is to be had to the accompanying drawings forming part hereof, wherein, Figure 1 is a face view of a panel box embodying my invention; Fig. 2 is a section on the line 2, 2, in Fig. 1; Fig. 3 is an enlarged detail section on the line 3, 3, in Fig. 1; Fig. 4 is an inverted plan view of the frame at the open side of the box, embodying my improvements; Fig. 5 is an enlarged detail section on the line 5, 5, in Fig. 1, and Fig. 6 is a sectional detail of a modification.

Similar numerals of reference indicate corresponding parts in the several views.

The box 1 may be of any suitable construction adapted for the purpose intended, and may be made of sheet metal suitably folded or formed to desired shape and having its walls properly secured together. In the example illustrated, the box 1 is shown provided with knockouts $1^a$, arranged in any suitable manner. At 2 is a frame detachably fitted at the open side of the box and provided with my improvements that are adapted to afford means for detachably connecting said frame with the box, and also to provide a rabbet or ledge projecting inwardly around the margin or edges $2^a$ of the opening $2^b$ in said frame that is protected by the cover 3. Said frame may comprise a suitable metal plate having the inner opening $2^b$. To such end I provide angle members 4 secured on the under surface of frame 2, in such manner that the webs $4^a$ of said members project inwardly of the edges $2^a$ of said frame to provide a ledge or rabbet all around the opening $2^b$, upon which ledge or rabbet the edge portions of cover 3 rest. The webs $4^b$ of said angle members depend from frame 2, or project substantially at right angles thereto, to fit along the adjacent marginal portions of box 1 at its open side. The webs $4^a$ may be secured to frame 2 by rivets 5 or the like, and means are provided for detachably connecting the webs $4^b$ with the box walls. The webs $4^b$ may fit within the box walls as in Figs. 1 to 5, or may fit without said walls, as in Fig. 6. In accordance with Figs. 1 to 5 I have shown the box walls provided with screws 6 and the webs $4^b$ provided with slots 7, whereby when the frame is applied upon the box the screws 6 may enter the slots 7, and then the screws may be turned to secure the webs and frame upon the box, as by inserting a screw driver through the frame within the open side of the box. In Fig. 6 the screws 6 are carried by the webs $4^b$ and the box sides are provided with the slots 7, whereby as the frame is applied upon the box the screws will pass into said slots, and then may be turned up tight against the box walls. Cover 3 is hinged at one side of the opening $2^b$ of frame 2, so as to rest within said opening upon the ledge or rabbet $4^a$, and thereby a flush surface of frame 2 and cover 3 may be provided by having said parts of similar sheets of metal as illustrated. A suitable lock at 8 may be provided, as upon cover 3, for securing the latter to the frame.

The form of hinge I have shown for securing cover 3 to frame 2 is simple yet strong and efficient, and avoids the necessity of riveting or screwing hinges upon the parts. To this end I provide one or more tongues 9 upon one of the webs $4^a$, which tongues are adapted to pass through corresponding slots 10 cut in cover 3 near its edge (Fig. 1), and by having said tongues suitably coiled through said slots the cover is readily hinged. As a simple and effective means to this end I have shown the tongues 9 cut out of the web $4^a$, by suitably slitting the latter as at 11 (Figs. 4 and 5) and coiling said tongues outwardly from said web through the opening $2^b$ of frame 2, and through the slots 10 of cover 3. Said tongues are shown located at their base portion within the adjacent edge $2^a$ of frame 2 and suitably coiled so that their ends lie over the adjacent marginal portion of frame 2 (see Fig. 5). To apply the cover and frame 2 in connection with the hinge-carrying member 4, the tongues, after being properly coiled, may be passed through the slots 10 of cover 3, and then frame 2 may be slid along member 4 to adjust the parts, substantially as shown in Fig. 5, and then said member may be riveted to frame 2. The other members 4 may be riveted to frame 2 before or after the member 4 having the tongues 9 is secured to frame 2. By the arrangements described the cover 3 is free to swing and yet lie freely upon the rabbet or edges 4ª and flush therewith within opening 2ᵇ of frame 2, without interference by the hinge members or tongues, and when the cover swings its edge may rest upon the member 4 having the tongues 9, as a bearing point.

By means of my improvements boxes of the class described may be made readily and cheaply, and will be efficient in use, since the open side of the box is securely covered, and the angle members 4 make a secure and somewhat tight fit all around at the open side of the box. The box is adapted to be applied in a wall with its laterally extended frame substantially flush with the surface of the wall, in a well known manner.

While I have shown my improvements as applied in conjunction with a panel box for electric fittings, it will be obvious that the box may be adapted for any other uses desired, also that changes may be made in the details of construction and arrangements of parts set forth, within the scope of the appended claims, without departing from the spirit of the invention.

Having now described my invention what I claim is:—

1. The combination of a box, with a frame having an opening adapted to fit over the open side of the box, angle members secured on the inner side of said frame within its outer edge and webs of said members projecting inwardly from the edges of the opening of the frame providing a ledge or rabbet for a cover, other webs of said members being adapted to fit along the margins of the box walls, means to detachably secure said frame upon the box, one of said members having a tongue, and a cover to fit upon said ledge or rabbet and provided with a slot, said tongue being coiled through said slot, pivotally retaining the cover to swing on the corresponding angle member.

2. The combination of a box, with a frame having an opening adapted to fit over the open side of the box, angle members secured on the inner side of said frame within its outer edge and webs of said members projecting inwardly from the edges of the opening of the frame providing a ledge or rabbet for a cover, other webs of said members being adapted to fit along the margins of the box walls, means to detachably secure said frame upon the box, one of said members having a tongue projecting through the opening of said frame, and a cover to fit upon said ledge or rabbet and provided with a slot, said tongue being coiled through said slot, and extending at its free end over the frame pivotally retaining the cover to swing with its adjacent edge resting upon the opposing angle member.

3. The combination of a box, with a frame having an opening adapted to fit over the open side of the box, said frame having angle members secured on its inner side, webs of said members projecting inwardly from the edges of the opening of the frame providing a ledge or rabbet for a cover, other webs of said members being adapted to fit along the margins of the box walls, means to detachably secure said frame upon the box, one of said members having a tongue projecting through the opening of said frame and having its free end over and close to an adjacent marginal portion of said frame, and a cover to fit upon said ledge or rabbet and provided with a slot, said tongue being coiled through said slot, the proximity of the end of said tongue to said frame preventing displacement of the cover from the frame.

4. The combination of a box, with a frame having an opening adapted to fit over the open side of the box, means to removably secure said frame upon the box, a cover, said frame having means at its said opening to support the cover, said frame having a member secured on its inner side provided with a tongue struck out from said member and projecting through said opening of said frame, said cover having a slot, said tongue being coiled through said slot, pivotally retaining the cover to swing with its edge resting on said member.

Signed at New York city, in the county of New York, and State of New York, this 31st day of March, A. D. 1914.

LOUIS KOSSOY.

Witnesses:
 MARIE F. WAINRIGHT,
 T. F. BOURNE.